US010019277B2

(12) United States Patent
Ulatoski et al.

(10) Patent No.: US 10,019,277 B2
(45) Date of Patent: *Jul. 10, 2018

(54) TRIGGERING APPLICATION ATTACHMENT BASED ON STATE CHANGES OF VIRTUAL MACHINES

(71) Applicant: VMware, Inc., Palo Alto, CA (US)

(72) Inventors: Jeffrey Ulatoski, Pleasanton, CA (US);
Steven Lawson, Aurora, CO (US);
Matthew Conover, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/731,093

(22) Filed: Jun. 4, 2015

(65) Prior Publication Data
US 2016/0357585 A1 Dec. 8, 2016

(51) Int. Cl.
*G06F 9/455* (2018.01)
*G06F 9/445* (2018.01)

(52) U.S. Cl.
CPC ........ *G06F 9/45558* (2013.01); *G06F 9/4451* (2013.01); *G06F 2009/45562* (2013.01); *G06F 2009/45575* (2013.01)

(58) Field of Classification Search
None
See application file for complete search history.

(56) References Cited

U.S. PATENT DOCUMENTS

| 7,249,168 | B1 * | 7/2007 | Ryder | G06F 21/305 |
| | | | | 707/E17.032 |
| 7,657,720 | B2 * | 2/2010 | Otani | G06F 11/1458 |
| | | | | 707/682 |
| 7,810,092 | B1 | 10/2010 | van Rietschote et al. | |
| 8,103,906 | B1 | 1/2012 | Alibakhsh et al. | |
| 8,910,156 | B1 | 12/2014 | Kenchammana-Hosekote et al. | |
| 8,959,513 | B1 * | 2/2015 | Swaminathan | G06F 9/505 |
| | | | | 709/223 |
| 9,060,028 | B1 * | 6/2015 | Azem | H04L 63/205 |
| 9,158,561 | B2 * | 10/2015 | Conover | G06F 8/65 |
| 9,203,903 | B2 * | 12/2015 | Sumrall | G06F 21/00 |
| 9,378,040 | B2 * | 6/2016 | Conover | G06F 9/44505 |
| 9,465,638 | B2 * | 10/2016 | Conover | G06F 9/45558 |
| 9,477,531 | B2 * | 10/2016 | Chawla | G06F 9/5077 |
| 9,639,385 | B2 * | 5/2017 | Conover | G06F 9/45533 |
| 9,672,061 | B2 * | 6/2017 | Conover | G06F 9/45558 |

(Continued)

FOREIGN PATENT DOCUMENTS

WO  WO 2014018644 A2 * 1/2014 ......... G06F 9/45558

*Primary Examiner* — Hiren Patel

(57) ABSTRACT

Described herein are systems, methods, and software to provide virtualized computing sessions with attachable volumes to requesting users. In one implementation, a virtual computing service identifies a service login for an end user to initiate a virtual computing session. In response to the service login, the virtual computing service identifies a virtual machine to allocate to the virtual computing service, and initiates a user login process to log the end user into the virtual machine. The virtual computing service further initiates, prior to completing the user login process, a volume attach process to attach at least one storage volume to the virtual machine based on credentials associated with the service login.

19 Claims, 11 Drawing Sheets

(56) References Cited

U.S. PATENT DOCUMENTS

| | | | |
|---|---|---|---|
| 9,864,625 B2* | 1/2018 | Chawla | G06F 9/45558 |
| 2009/0125711 A1* | 5/2009 | Schneider | G06F 21/53 |
| | | | 713/100 |
| 2010/0205304 A1* | 8/2010 | Chaturvedi | H04L 61/2015 |
| | | | 709/226 |
| 2011/0185355 A1* | 7/2011 | Chawla | G06F 9/5077 |
| | | | 718/1 |
| 2012/0174096 A1* | 7/2012 | Conover | G06F 9/45558 |
| | | | 718/1 |
| 2013/0018939 A1* | 1/2013 | Chawla | H04L 67/08 |
| | | | 709/203 |
| 2013/0047160 A1* | 2/2013 | Conover | G06F 8/65 |
| | | | 718/1 |
| 2013/0133051 A1* | 5/2013 | Riemers | G06F 17/30091 |
| | | | 726/7 |
| 2013/0290960 A1* | 10/2013 | Astete | G06F 9/45533 |
| | | | 718/1 |
| 2014/0050209 A1* | 2/2014 | Bajko | H04L 29/12283 |
| | | | 370/338 |
| 2014/0096134 A1* | 4/2014 | Barak | G06F 9/45558 |
| | | | 718/1 |
| 2014/0201736 A1 | 7/2014 | Mizrahi et al. | |
| 2014/0258235 A1* | 9/2014 | Jin | G06F 9/45558 |
| | | | 707/639 |
| 2014/0280800 A1* | 9/2014 | Verchere | H04L 41/0813 |
| | | | 709/221 |
| 2014/0281619 A1* | 9/2014 | Conover | G06F 1/3234 |
| | | | 713/323 |
| 2014/0282623 A1* | 9/2014 | Conover | G06F 9/45558 |
| | | | 719/318 |
| 2014/0337236 A1* | 11/2014 | Wong | G06Q 20/363 |
| | | | 705/71 |
| 2014/0337965 A1* | 11/2014 | Savini | H04L 63/0272 |
| | | | 726/15 |
| 2014/0351815 A1* | 11/2014 | Conover | G06F 9/45558 |
| | | | 718/1 |
| 2015/0074126 A1* | 3/2015 | Choudhary | G06F 9/542 |
| | | | 707/754 |
| 2015/0229723 A1* | 8/2015 | Bosman | H04L 67/1097 |
| | | | 707/784 |
| 2015/0281198 A1* | 10/2015 | Lee | H04W 8/18 |
| | | | 726/7 |
| 2015/0339317 A1* | 11/2015 | Choudhary | G06F 17/30174 |
| | | | 707/625 |
| 2015/0378624 A1* | 12/2015 | Choudhary | G06F 3/0619 |
| | | | 711/114 |
| 2016/0034297 A1* | 2/2016 | Conover | G06F 8/65 |
| | | | 718/1 |
| 2017/0262308 A1* | 9/2017 | Conover | G06F 9/45558 |
| 2017/0344392 A1* | 11/2017 | Ulatoski | G06F 9/45558 |

* cited by examiner

TRIGGERING APPLICATION ATTACHMENT BASED ON STATE CHANGES OF VIRTUAL MACHINES

TECHNICAL BACKGROUND

In virtual computing environments, host computers may execute a plurality of virtual machines that can be accessed as a service by end users. These users may login to the service via end user devices and, in response to the login, be provided with a virtual machine to accomplish desired tasks. Once the user logs out of the service or the virtual machine, the service may allocate the same virtual machine to a new requesting user.

Although this service model allows multiple users to access virtual machines and the applications available thereon, each of the users may require a different set of applications. For example, an engineer of an organization may require a different set of applications than a financial officer of the same organization. To remedy this issue, previous solutions have provided for attaching application volumes to a virtual machine in response to an agent request within the virtual machine. For example, a user may initiate a login process to a virtual machine and, in response to completing the login process, an agent on the virtual machine may attach application volumes associated with the particular end user.

Once the application volumes are attached, the user may execute the applications located in the attached volume as if the applications were locally installed on the virtual machine. However, delaying the attachment of storage volumes until the login process is completed can cause frustration, as applications and data are not immediately available to the end user upon completing the login process.

OVERVIEW

The technology disclosed herein enhances how virtual machine sessions can be provided to requesting end users. In at least one implementation, a virtual computing service identifies a service login request for a virtual computing session by a user at an end user device. In response the service login, the virtual computing service identifies a virtual machine to allocate to the virtual computing session, and initiates a user login process to log the end user into the virtual machine. Prior to completing the login process, the virtual computing service initiates a volume attach process to attach at least one application storage volume to the virtual machine based on credentials associated with the service login.

The volume attach process may include mounting the at least one application storage volume to the virtual machine, and overlaying contents of the at least one application storage volume in the virtual machine to make at least one application stored thereon available for execution. By initiating the attach process prior to completing the login process on the virtual machine, the end user may be provided with associated applications sooner upon login to the virtual machine.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

Figure 1:
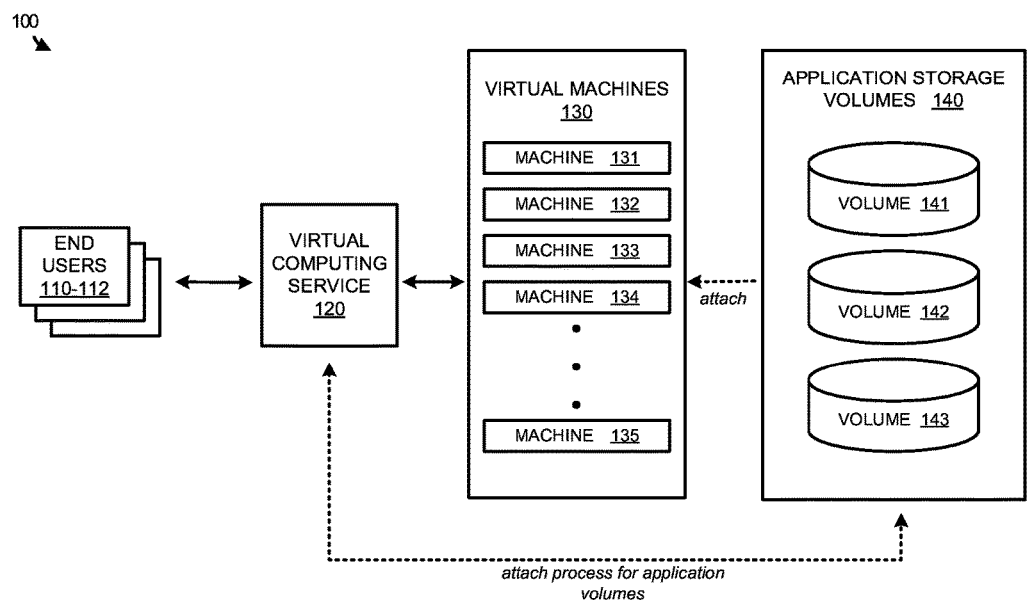
FIG. 1 illustrates a virtualization environment to provide user initiated virtual computing sessions according to one implementation.

The various examples disclosed herein provide for delivering attachable storage volumes to user initiated virtual computing sessions. In many situations, virtual machines provide a centralized computing platform for one or more end users to access and execute desired applications and operations. To provide each of the end users with the required applications, and prevent access to unnecessary applications, one or more application storage volumes are made available in the virtual environment that are capable of being attached to the individual virtual machines. These application storage volumes may include, but are not limited to, virtual machine disks (VMDKs), virtual hard disks (VHDs), or some other virtual disk file capable of storing applications for execution on the virtual machines.

To make the applications available to each individual user, a virtual computing service may be employed that acts as a broker between the end users and the plurality of virtual machines, and further acts as a volume manager that initiates the attachment of application storage volumes to the individual virtual machines. For example, a user may, via an end user device, initiate a service login to initiate a virtual computing session. This service login may be accomplished using an application on the end user device, a web browser interface on the end user device, or any other similar interface on the end user device. Responsive to the service login, the virtual computing service may identify an available virtual machine to allocate to the end user, and initiate a user login process to log the end user into the virtual machine. Prior to the completion of the login process on the virtual machine, the virtual computing service may initiate a volume attach process to attach at least one application storage volume to the virtual machine based on credentials associated with the service login. For example, an end user may login to the service using a username and password. Based on the username, one or more applications may be identified for the end user, and corresponding application storage volumes with the applications may be attached to the virtual machine. Once attached and the user is logged into the virtual machine, the user may execute any of the applications from the attached storage volumes.

In some examples, the virtual machine that is identified may require a change in power state because it is powered off, in a suspended mode, or otherwise similarly unavailable to be provided to the requesting end user. Accordingly, the virtual computing service may initiate a change in the state of the virtual machine. This initiation of the state change may be directed at a hypervisor, a host, or some other process associated with the virtual machine that, upon changing the state of the virtual machine, may notify the virtual computing service of the changed state. In response to the notification of the changed state, the virtual computing service may initiate a volume attach process to attach at least one application storage volume to the virtual machine based on credentials associated with the service login. Once the volumes are attached and the end user is logged into the virtual machine, the user may execute any of the applications from the attached storage volumes.

To attach the volumes to the virtual machine, the virtual computing service may initiate a process to mount the volumes to the allocated virtual machine for the end user, and overlay the contents of the volumes to make the one or more applications within the volumes executable by the virtual machine. In some examples, mounting a volume to the virtual machine may include providing an access path and mount point for the volume to the virtual machine, which may comprise an internet protocol (IP) address, a directory name, a file name, or any other path information to access the contents of the particular volume. In some implementations, to mount the volumes, the virtual computing service may communicate directly with the storage volumes and the virtual machine to mount the volumes to the virtual machine, however, in other examples, the virtual computing service may communicate with a hypervisor for the virtual machine to mount the required volumes. Once mounted, the contents of the volume may be overlaid within the virtual machine to make the application executable. This overlaying may include modifying registry keys to make the application executable from the attached volume, as well as modifying the file system view to make the application appear as though it has been locally installed. For example, when an application storage volume is attached to a virtual machine, the files and directories for the application may appear in the "C:\Program Files" directory, although the executable file components remain stored in the attached volume.

In some implementations, administrators may manage and perform installation processes to store the applications in the application storage volumes. These installation processes may extract the necessary files and registry keys from an installer, and store the files and registry keys to an appropriate application storage volume. In some examples, the administrator may define application stacks, or groups of applications that are commonly assigned, and store these applications within a single application storage volume. For example, a first application storage volume may include productivity applications to be supplied to a first set of end users, and a second application storage volume may include video and image editing software to be provided to a second set of end users. Once the applications are stored within the application volumes, the administrator may define which of the applications or volumes are associated with each individual end user of the virtual environment.

Referring now to FIG. 1, FIG. 1 illustrates a virtualization environment 100 to provide user initiated virtual computing sessions according to one implementation. Virtualization environment 100 includes users 110-112, virtual computing service 120, virtual machines 130, and application storage volumes 140. Virtual computing service 120 may comprise one or more computing devices capable of providing virtual machines to requesting end users. Virtual machines 130 include individual machines 131-135, although any number of virtual machines may be included within a virtualization environment. Virtual machines 131-135 may include an operating system, such as Microsoft Windows, and one or more locally installed applications or services. Application storage volumes 140 include volumes 141-143, which each store components for one or more applications. These components may include application files and registry keys required for each of the applications to execute.

In operation, virtual machines 131-135 execute on one or more host computing systems to provide a platform for users to access and execute centralized applications. In particular, users 110-112 may, via end user devices and a communication network, initiate a service login to virtual computing service 120 and, in turn, be provided with a remote desktop view of a particular virtual machine. For example, virtual computing service 120 may identify a session initiation request from user 110 for a virtual machine. Responsive to the request, virtual computing service 120 may identify a virtual machine in virtual machines 130 to be provided to the user, and initiate a login process to the particular virtual machine. Once the login process to the virtual machine is complete, the user may be provided a remote desktop view of the virtual machine via the end user device, which may comprise a desktop computer, laptop computer, tablet computer, or some other similar end user device.

Here, in addition to the locally installed applications of the virtual machines, one or more applications may be attached to a virtual machine based on the credentials associated with the requesting end user. For example, a requesting user may include credentials that provide the user with productivity applications, such as word processing applications, spreadsheet applications, presentation applications, and the like. As a result when the virtual computing service 120 identifies a session request from an end user, virtual computing service 120 will identify a virtual machine for the end user, and initiate attachment of one or more volumes 141-143 from application storage volumes 140 that contain the required productivity applications.

To attach the volumes to the virtual machine, virtual computing service 120 may initiate a process to mount the volumes to the virtual machine, and overlay the contents of the volumes to make the one or more applications within the volumes executable by the virtual machine. In some examples, mounting the volumes to the virtual machine may include providing an access path or mount point for the volume to the virtual machine. This access path may include an internet protocol (IP) address, a directory name, or any other path information to access the contents of the particular volume. Once mounted, the contents of the volume may be overlaid within the virtual machine to make the application executable. For example, registry keys may be updated in the virtual machine to reflect the applications available in the attachable volumes, and application files and directories may be made available for operation within the virtual machine. In some implementations, the directories and files for the application may be overlaid in an application storage location for the file system. For example, in a Microsoft Windows virtual machine, directories and files for the attached applications may appear visible in the "C:\Program Files" directory, although the executable file components are stored in the attached volume.

Figure 2:
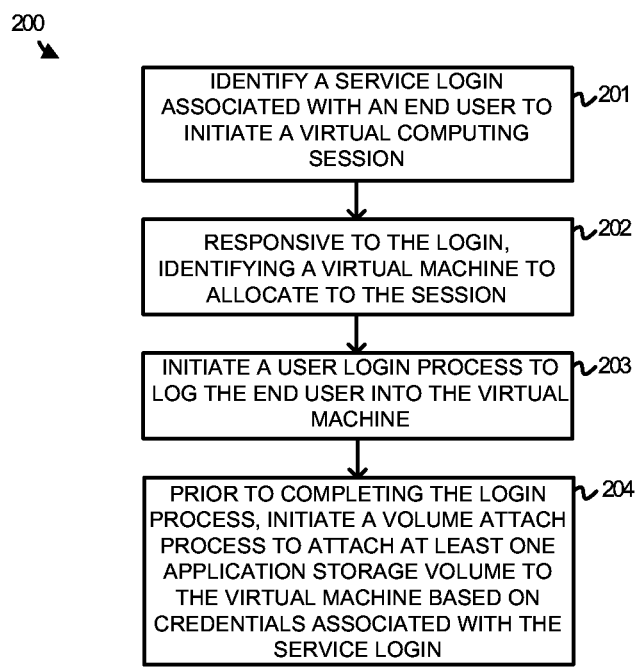
FIG. 2 illustrates a method of operating a virtual computing service to provide end user initiated virtual computing sessions according to one implementation.

To further demonstrate the operation of virtual computing service 120, FIG. 2 is provided. FIG. 2 illustrates a method 200 of operating virtual computing service 120 to provide end user initiated virtual computing sessions. As described herein, virtualization environment 100 includes a plurality of virtual machines that can be used by end users to perform desired tasks. However, the virtual machines are not persistent to each individual user, and are assigned to the user only when the user requires a virtual computing session. Accordingly, to provide an end user with a required session, virtual computing service 120 identifies a service login associated with an end user to initiate a virtual computing session (201). In response to the service login, virtual computing service 120 identifies a virtual machine to allocate to the session (202). In some implementations, to identify the virtual machine, virtual computing service 120 may identify a virtual machine that is idle and not allocated to any other end user.

Once the virtual machine is identified, virtual computing service 120 initiates a user login process to log the end user into the virtual machine (203). This login process may include providing credentials of the end user to use the allocated virtual machine, may prepare the virtual machine to be presented as a remote desktop to the end user device, or any other login process to the virtual machine. Prior to completing the login process for the end user, virtual computing service 120 initiates a volume attach process to attach at least one application storage volume to the virtual machine based on credentials associated with service login (204). In some examples, the attach process may occur prior to initiating the login process to the virtual machine, however, in other instances, the attach process may occur after the login process is initiated. In some implementations, the volume attach process may include mounting the at least one application storage volume to the virtual machine, and overlaying contents of the at least one application storage volume in the virtual machine to make at least one application in the storage volume executable. To mount the volume, virtual computing service 120 may communicate directly with the storage volumes and the virtual machine to mount the volumes to the virtual machine, however, in other examples, virtual computing service 120 may communicate with the hypervisor for the virtual machine to mount the required volume. Once the volumes are attached and the user login process is completed, the user may remotely execute any of the applications from the attached storage volumes on the virtual machine.

Referring to FIG. 1 as an example, end user 110 may, via an end user device over a network, initiate a service login with virtual computing service 120. In response to the login, virtual computing service 120 may identify a virtual machine in virtual machines 130 that can be allocated to end user 110, and initiate a user login process to log end user 110 into the identified virtual machine. For example, virtual computing service 120 may identify that virtual machine 131 is operational and is not allocated to any other user. As a result, virtual computing service 120 may initiate a user login process to prepare virtual machine 131 for end user 110. Prior to completing the user login process, virtual computing service 120 further identifies one or more application storage volumes in application storage volumes 140 to be attached to virtual machine 131 based on credentials associated with the service login. For example, specific volumes and applications may be associated with a username associated with the end user. Once the volumes, are identified, an attach process is initiated to make the applications on the identified volumes available for execution on virtual machine 131.

In some implementations, the attach process may comprise mounting the identified application storage volumes to the virtual machine, and overlaying the contents of the application storage volumes into the virtual machine to make the application executable. By mounting the application to the virtual machine, the virtual machine is provided an access path to the components of the application, wherein the components may include the registry keys and files required to make the application executable. Once attached, the contents of the volume may be overlaid in the virtual machine. This overlaying may include modifying the registry keys of the virtual machine to include the registry keys for the application and may further include, in some examples, making the application files appear as though they have been locally installed within the virtual machine. Thus, using a Microsoft Windows virtual machine as an example, the files and directories for the application may appear within the "C:\Program Files" directory, despite the location of the executables remaining in the application storage volume. As a result of the overlaying, when the user selects an application within the C: drive, the selection may be identified in the virtual machine, and the proper executable files will be executed from the application storage volume attached to the virtual machine.

In some examples, the virtual machine that is identified may require a change in power state because it is powered off, in a suspended mode, or otherwise similarly unavailable to be provided to the requesting end user. Accordingly, the virtual computing service may initiate a change in the state of the virtual machine. This initiation of the state change may be directed at a hypervisor, a host, or some other process capable of changing the state of the virtual machine. Once the state of the virtual machine is changed, the hypervisor, or some other monitoring process for the virtual machine, may notify the virtual computing service of the changed state. In response to the notification of the changed state, the virtual computing service may initiate a volume attach process to attach at least one application storage volume to the virtual machine based on credentials associated with the service login. The virtual computing service may further initiate a login process to log the end user into the virtual machine to access the desktop of the virtual machine and the attached applications.

Although not illustrated in FIG. 1, it should be understood that in some examples to initiate the attach process to the virtual machines, virtual computing service 120 may communicate with hypervisors and agents within each of the virtual machines to mount and overlay the contents in the virtual machine. For example, based on instructions from virtual computing service 120, the hypervisors may provide the virtual machines with the necessary access paths for the application storage volumes. Once mounted, an agent local to the virtual machine may overlay the components of the application.

Figure 3:
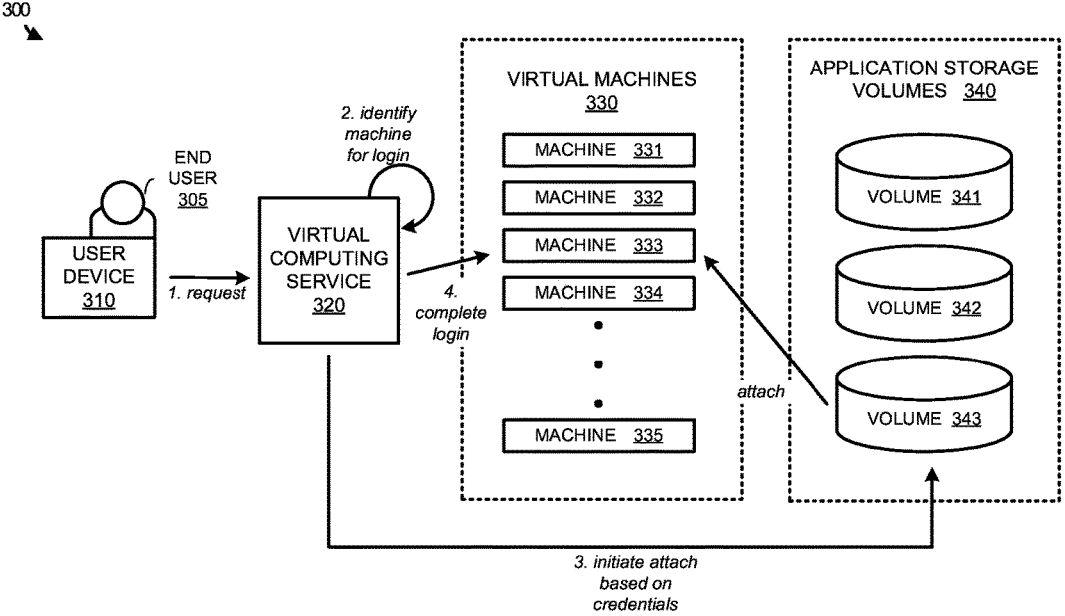
FIG. 3 illustrates an operational scenario of providing a user initiated virtual computing session according to one implementation.

Referring now to FIG. 3, FIG. 3 illustrates an operational scenario 300 of providing a user initiated virtual computing session according to one implementation. Operational scenario 300 includes end user 305, user device 310, virtual computing service 320, virtual machines 330, and application storage volumes 340. Virtual computing service 320 may comprise one or more computing devices capable of providing virtual machines to requesting end users. Virtual machines 330 include individual virtual machines 331-335, and application storage volumes 340 include individual volumes 341-343. Each of volumes 341-343 in application storage volumes 340 includes one or more applications that are associated with end users based on the end user requirements. Thus, volumes that include applications that are not required by an end user will not be associated with the end user.

As illustrated in FIG. 3, end user 310 initiates a service login request to virtual computing service 320 via user device 310. User device 310 may comprise a desktop computer, laptop computer, tablet, smartphone, or any other similar end user device that can request a virtual desktop. To initiate the service login, end user device 310 may include a dedicated application to access the virtual environment, or may include a web browser that allows the user to initiate the service login request over a network to receive a virtual desktop. In some implementations, end user 305 may supply credentials to request a virtual computing session. These credentials may include a username, password, or any other similar information to identify end user 305 and determine permissions to access a virtual machine in the virtual environment.

In response to the service login request, virtual computing service 320, which acts as a broker for the requests, identifies virtual machine 333 to allocate to the user initiated session, and initiates a user login process to log the end user into virtual machine 333. To determine the virtual machine, virtual computing service 320 may identify a machine that is idle and currently is not allocated to another end user. Once identified, virtual computing service 320 initiates a login process for the user into the identified virtual machine. This login process may include providing user credentials to the virtual machine to give the user access to the virtual machine, and negotiating the parameters to provide user device 310 with a remote desktop view of the identified virtual machine, amongst other possible login processes.

Here, in addition to the operating system and processes installed locally on the virtual machine, virtual computing service 320 is also configured to provide one or more applications via application storage volumes 340 to a requesting end user. To provide the volumes, virtual computing service 320 initiates, prior to completing the user login process to virtual machine 333, a volume attach process to attach at least one application storage volume from application storage volumes 340 to the virtual machine based on credentials associated with the service login. For example, virtual computing service 320 may have access to a database or data structure that correlates usernames to applications or volumes of applications that should be associated with each user. In the example of FIG. 3, virtual computing service 320 identifies that volume 343 and the applications stored therein are required for end user 305. These applications may include productivity applications, image or video editing applications, development applications, or any other similar application or group of applications.

To attach the application volume to virtual machine 333 for end user 305, virtual computing service 320 may be configured to initiate a mounting process for volume 343 to provide a mount point for the file system in volume 343 to virtual machine 333. By mounting volume 343, virtual machine 333 may access the components, such as registry keys and files, for the application. Once mounted, the attach process may overlay the components of the application within virtual machine 333. For example, volume 343 may include registry keys and executable files for the applications. Upon being mounted to virtual machine 333, the registry keys within virtual machine 333 may be modified to include the registry keys for the applications on volume 343. Further, directories and files for the application may be made visible in a location as though the application were installed locally. Thus, the directories and files for the application may appear visible in a program files directory of the virtual machine, although the executable files may remain on the attached volume.

In some implementations, application storage volumes 340 may include read-only access to end users that require the applications. As a result, end user 305 may attach volume 343 to virtual machine 333 to execute various applications, and a second end user may attach volume 343 to a separate virtual machine to execute the same applications. Thus, an application may be installed to one volume, but accessible to a plurality of users and virtual desktops.

Figure 4:
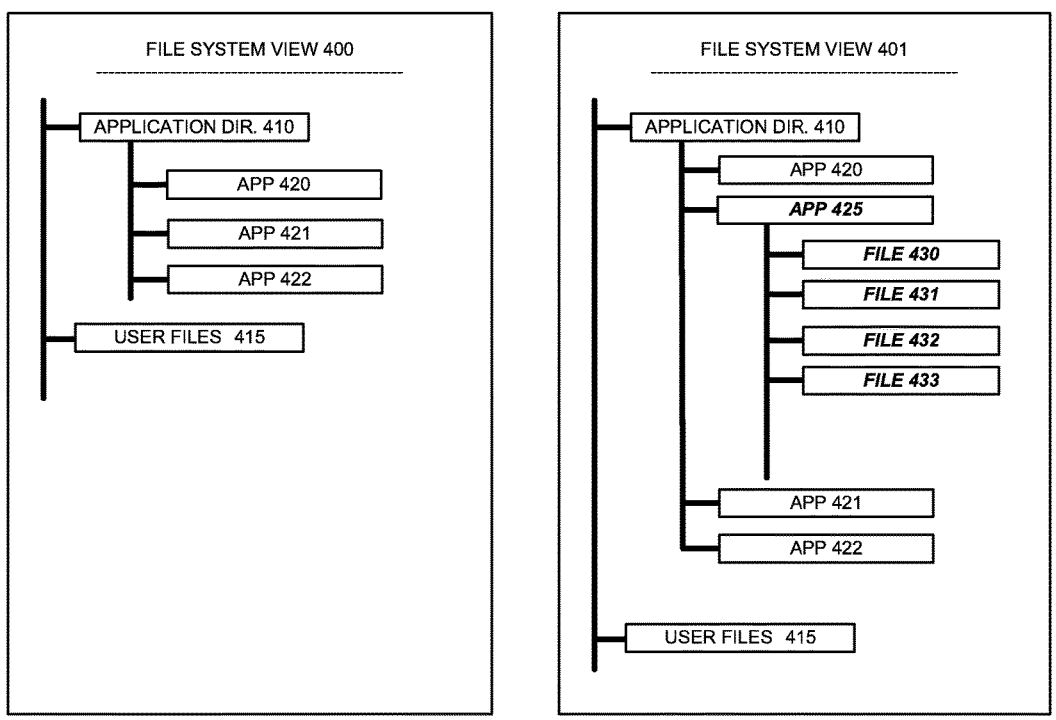
FIG. 4 illustrates a file system overlay process to make applications available in virtual machine according to one implementation.

To further demonstrate the overlaying of application components from attachable volumes into virtual machines, FIG. 4 is provided. FIG. 4 illustrates a file system overlay process to make applications available in a virtual machine according to one implementation. FIG. 4 includes file system view 400 and file system view 401. File system view 400 is an example base file system view for a virtual machine without attached volumes, and includes an application directory 410, applications 420-422, and user files 415. In some implementations, this base file system may be provided in a plurality of virtual machines for the virtual environment. For example, one image of a virtual machine may be duplicated into a plurality of virtual machines accessible for sessions by the end users.

As described herein, once an end user requests a virtual session, a virtual machine may be identified for the session, and a login process may be initiated on the virtual machine. Prior to completing the login process on the virtual machine, a process may be initiated to identify and attach one or more application storage volumes associated with the end user. In some examples, the attach process may occur prior to initiating the login process to the virtual machine, however, in other instances, the attach process may occur after the login process is initiated. To attach an application storage volume to the virtual machine, the volume may be mounted to the virtual machine, and an overlay process may be executed to make the applications executable from the application storage volume. This overlay process may include modifying the registry keys on the virtual machine to include the registry keys for the application, and further include overlaying the files for the attached applications in a location of the virtual machine as if the application were locally installed.

Referring to file system 401 as an example, application 425 has been added to the file system view and includes files 430-433, which are required for the execution of application 425. Although the files are made visible within application directory 410 with the other applications that have been locally installed, files 430-433 are not copied or duplicated into the local disk file for the virtual machine. Rather, the files for the application are made visible and accessible in the application directory, but act as pointers to the files and executables located on the attached application storage volume. Thus, using a Microsoft Windows virtual machine as an example, pointers for the application files and directories may be placed in the "C:\Program Files" directory for selection and execution by the end user. Further, icons and other selectors may be placed on the Desktop or in start menus that allow the end user to select and execute the attached application from the application storage volume.

Although illustrated in the previous examples as attaching application volumes to the virtual machine, it should be understood that similar processes might be used to attach user volumes with user data to a virtual machine. Rather than the read-only application volumes that can be attached to a plurality of virtual machines at any single instance, the user volumes may allow the user to create, edit, and delete a variety of files at the user's discretion. These files may include documents, images, videos, as well as user installed applications and their components. Accordingly, when the user initiates a write, rather than writing locally to the virtual machine, the write may be saved within a user volume.

For example, a user may save a text file to a documents folder on the virtual machine. Rather than storing the file in the local documents folder on the virtual machine, a pointer will be generated that is visible in the documents folder, while the actual document data is stored in the user volume. When the user logs out of the session, the file will remain in the user volume that can be accessed by any of the virtual machines within the environment. Thus, when the user attempts to initiate another virtual session and is assigned another virtual machine, the user volume may be attached, and the text file made available and visible to the user in the documents folder of the new virtual machine.

Figure 5:
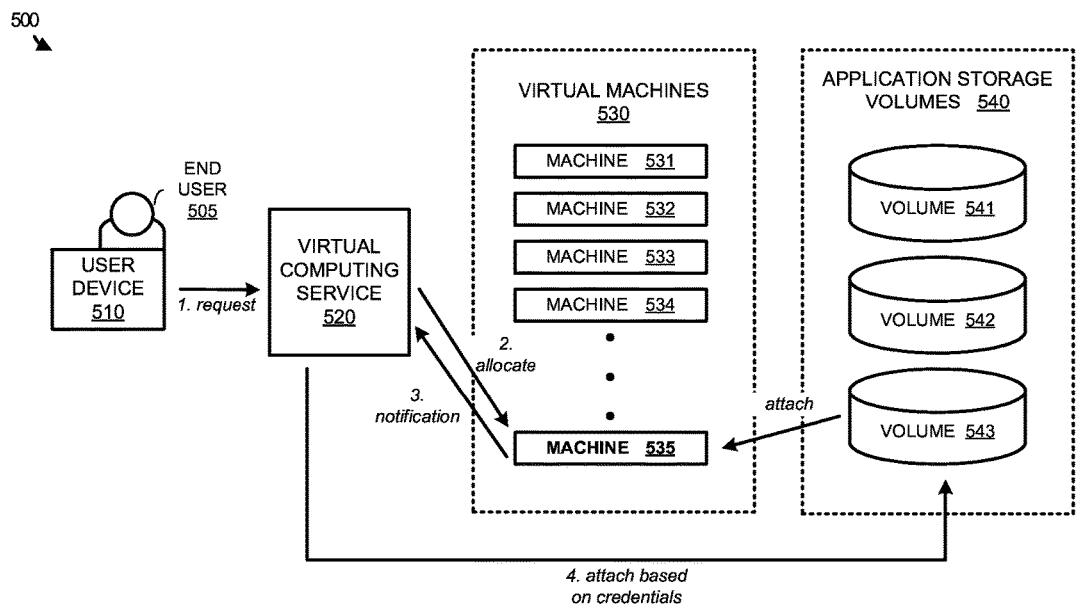
FIG. 5 illustrates an operational scenario of allocating virtual machines to virtual computing sessions according to one implementation.

To demonstrate another implementation of providing application volumes to virtual computing sessions, FIG. 5 is included. FIG. 5 illustrates an operational scenario 500 of allocating virtual machines to virtual computing sessions according to one implementation. Operational scenario 500 includes end user 505, user device 510, virtual computing service 520, virtual machines 530, and application storage volumes 540. Virtual computing service 120 may comprise one or more computing devices capable of providing virtual machines to requesting end users. Virtual machines 530 include individual virtual machines 531-535, and application storage volumes 540 further includes volumes 541-543. Virtual machines 530 execute on one or more host computing systems and corresponding hypervisors that abstract the components of the physical host and provide virtual components to the virtual machines.

As described herein, virtual computing service 520 may identify a service login to initiate a virtual computing session from user device 510 and end user 505. In response to the request, virtual computing service 520 identifies a virtual machine to allocate to the virtual session. Here, the virtual machine that is identified for the session requires a change in state before application storage volumes can be attached to the virtual machine. This change in state may include powering on the identified virtual machine on a host computing system, resuming the virtual machine from a suspended state on a host computing system, or any other similar state change to make the virtual machine available for the end user. To change the state, in some implementations, virtual computing service 520 may initiate a state change process on a host computing system for the virtual machine. As the state change occurs, virtual computing service 520 receives a notification corresponding to the virtual machine, indicating that the state has changed for the virtual machine. This notification may be transferred by a hypervisor providing a platform for the virtual machine, another process executing on the host with the virtual machine, or some other monitoring process within the virtual environment.

In response to the notification, virtual computing service 520 initiates a volume attach process to attach an application storage volume associated with credentials for end user 505. Referring to the example in FIG. 5, virtual computing service 520 identifies the request from user device 510, and identifies virtual machine 535 to provide the virtual computing session. Here, the virtual machine to be provided for the session is required to be powered on or resumed from a suspended state. Once the state has changed for virtual machine 535, a state change notification is received by virtual computing service 520 indicating the change in state for virtual machine 535. In response to the notification, virtual computing service initiates an attach process based on credentials for end user 505 as further described above in FIGS. 1-4.

Figure 6:
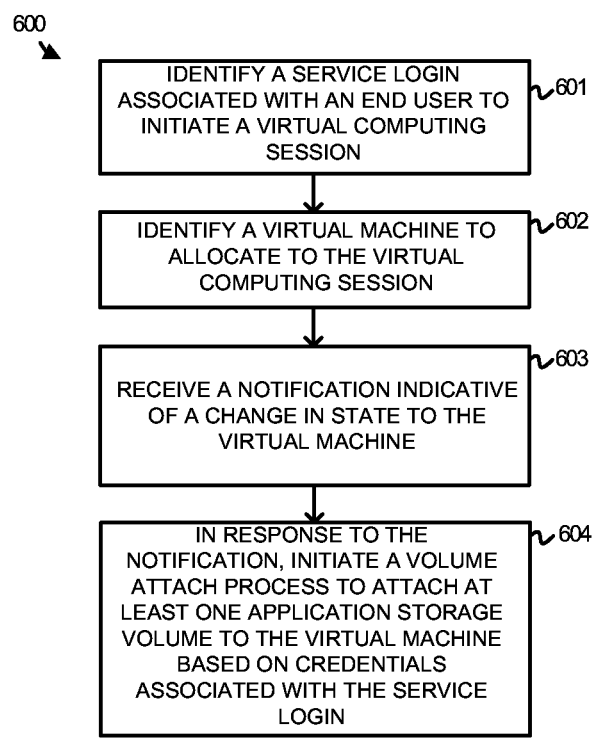
FIG. 6 illustrates a method of operating a virtual computing service to initiate attachment of application storage volumes based on state changes for virtual machines according to one implementation.

Referring to FIG. 6, FIG. 6 illustrates a method 600 of operating virtual computing service 520 to initiate attachment of application storage volumes based on state changes for virtual machines. As depicted, virtual computing service 520 identifies a service login associated with end user 505 to initiate a virtual computing session (601). In response to the service login, virtual computing service 520 identifies virtual machine 535 to allocate to the virtual computing session (602). In some examples, virtual computing service 520 may identify a virtual machine that is available to be powered on or removed from a state of suspension to be accessible by the end user.

After virtual machine 535 is identified and the state change is initiated, virtual computing service 520 receives a notification corresponding to virtual machine 535, indicative of a change in state to the virtual machine (603). This change in state may include a powered on state for the virtual machine, an active state for the virtual machine no longer in suspension, or any other similar state change for the virtual machine. This notification may be transferred by a hypervisor providing a platform for the virtual machine, another process executing on the host with the virtual machine, or some other monitoring process within the virtual environment. In response to the notification, virtual computing service initiates a volume attach process to attach at least one application storage volume to virtual machine 535 based on credentials associated with the service login (604). These credentials may include the username, a group name associated with the user, or any other similar credentials to determine the appropriate applications. Once the machine is in an available state, the requesting user may be logged into virtual machine 535 to access the processes available on the virtual machine.

As illustrated in FIG. 5, volume 543 is identified to be attached to virtual machine 535. To make the applications available in volume 543 to virtual machine 535, virtual computing service 520 may initiate a process to mount volume 543 to the virtual machine. Once mounted, either directly by virtual computing service 520 or through the assistance of a hypervisor for virtual machine 535, the contents of the volume may be overlaid within the virtual machine to make the application executable. For example, registry keys may be overlaid or added within the virtual machine's registry to register the application, and files may be overlaid within an application directory on the virtual machine.

Figure 7:
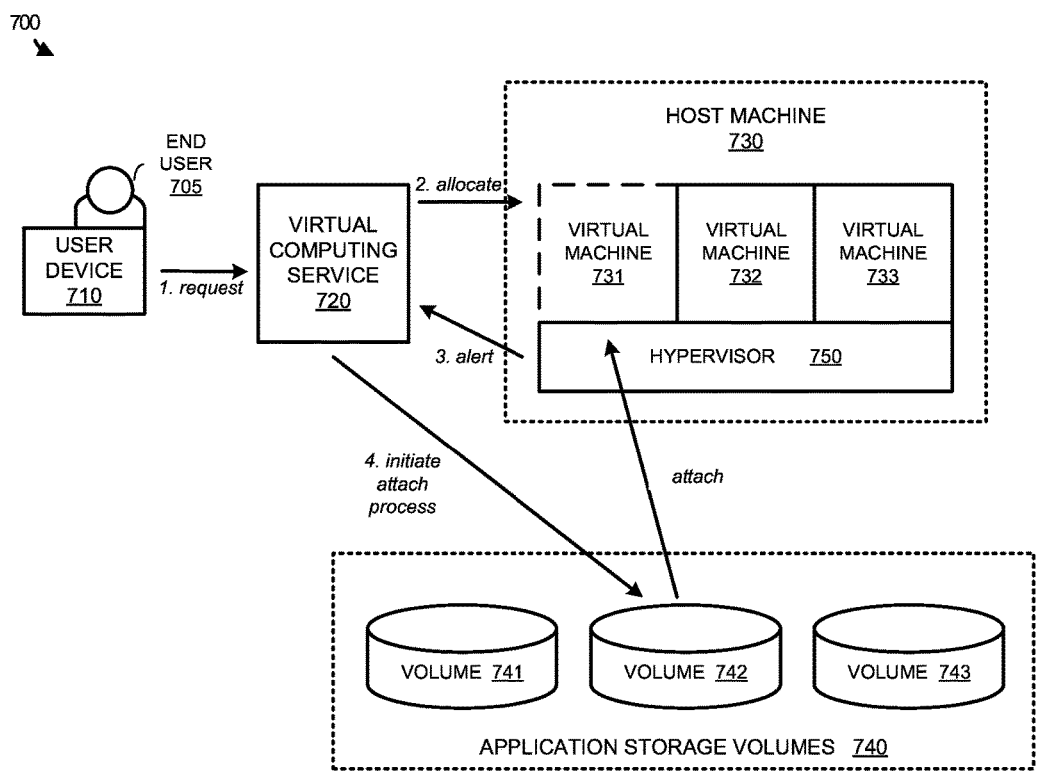
FIG. 7 illustrates a virtualization environment for providing application storage volumes to virtual machines based on service logins according to one implementation.

FIG. 7 illustrates a virtualization environment 700 for providing application storage volumes to virtual machines based on service logins. Virtualization environment 700 includes end user 705, virtual computing service 720, host machine 730, and application storage volumes 740. Virtual computing service 720 may comprise one or more computing devices capable of providing virtual machines to requesting end users. Host machine 730 is configured to execute hypervisor 750 and virtual machines 731-733, and application storage volumes 740 include volumes 741-743.

In operation, end user 705 requests a virtual computing session on user device 710, which is identified by virtual computing service 720. User device 710 may include a desktop computing device, laptop computing device, a tablet, a smartphone, or some other communication device capable of requesting a virtual machine over a network. Once the request for the session is identified, virtual computing service 720 identifies virtual machine 731 to allocate to the session. In some implementations, to identify the appropriate virtual machine, virtual computing service 720 may identify a virtual machine that is powered off or suspended, and not currently allocated to another end user. To make the virtual machine available for the end user, virtual computing service 720 may initiate a process to initiate execution of the virtual machine. This process may include notifying hypervisor 750 to power on or take the machine out of hibernation, notifying host machine 730 to power on or take the machine out of hibernation, or any other similar operation to make the virtual machine available.

In the present implementation, as the machine is initiated, hypervisor 750 monitors the state of the required virtual machine, and notifies or alerts virtual computing service 720 when the virtual machine has a change of state. This change of state may include a powered off to a powered on state for the virtual machine, or a suspended to available state for the virtual machine. In response to the notification, virtual computing service 720 may initiate the attachment of one or more volumes associated with end user 705. Here, end user 705 is associated with volume 742, which may include one or more applications required by end user 705. Thus, virtual computing service 720 may initiate attachment of volume 742 to make the required applications executable for the end user.

In some implementations, the attachment process of volume 742 may include mounting the volume to virtual machine 731 using computing service 1020 and/or hypervisor 1050. This mounting process provides an access path for the volume to the virtual machine, allowing the virtual machine to access the contents of the volume. Once the volume is mounted, in some examples, the contents of the volume may be overlaid within virtual machine to make the application executable. For example, the overlay process may add registry keys to virtual machine 731 that correspond to the applications stored in the volume, and may further overlay the files and directories for the attached applications within an application repository. For example, if volume 742 included components for a text editing application, such as the registry keys and files for the application, the registry keys for virtual machine 731 could be modified to include the text editing application keys, and the files for the application could be made accessible within a program files directory in the virtual machine. Accordingly, rather than appearing as a separate volume, the elements for the application may appear in a directory with other applications that have been locally installed. However, when the application is selected for execution, the executable files will be executed from the attached volume. Thus, although the components of the application appear local within a file system view, the executable components may be retrieved and executed from the attached volume.

By maintaining read-only application storage volume that can be accessed by a plurality of virtual machines, end users may be permitted to transfer between virtual machines, while maintaining the same application availability. For example, end user 705 may initially be provided with a remote desktop on virtual machine 733, which includes attached application volume 742. When end user 705 chooses to end the virtual computing session, end user 705 may be logged out from virtual machine 733, and volume 742 may be detached from virtual machine 733. This detach process may include un-mounting volume 742 from virtual machine 733 to prevent further access to the volume by virtual machine 733, and ensuring that all components that were overlaid in virtual machine 733 are no longer visible on the virtual machine.

However, when end user 705 requests another virtual computing session, virtual computing service 720 may allocate a new virtual machine 731 to end user 705 and initiate an attach process of volume 742. The attach process may be used to provide the same virtual desktop as was on virtual machine 733 for the users earlier session. This would include overlaying the files and directories in the same location on the new virtual machine.

Figure 8:
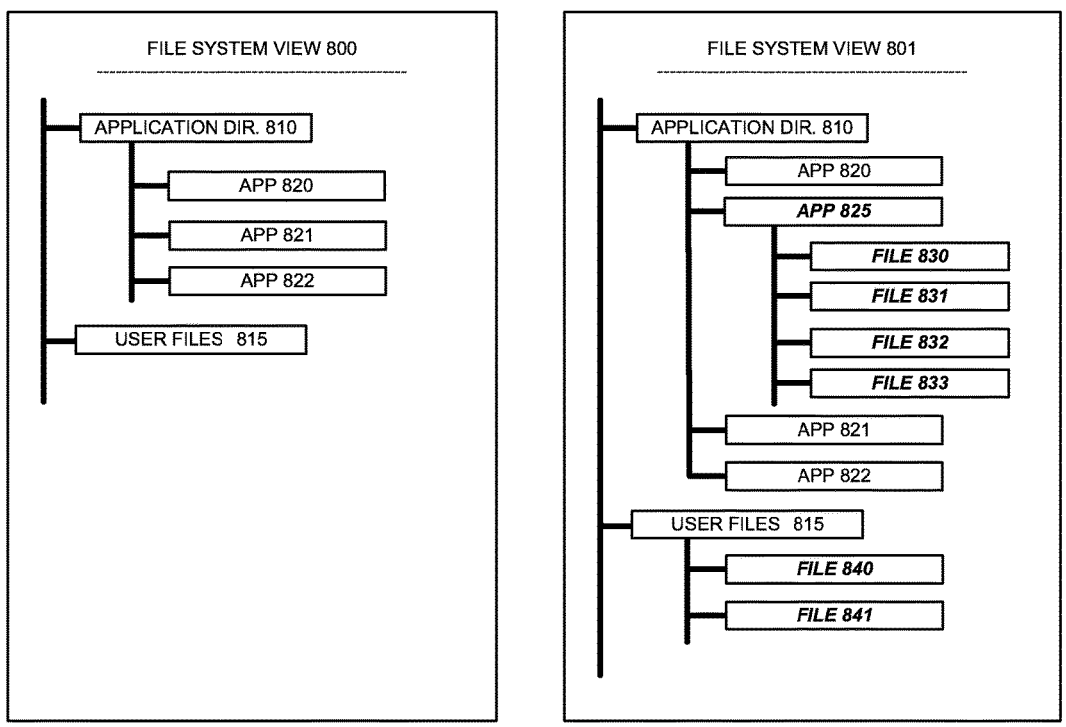
FIG. 8 illustrates an overlay process for user generated data and application data within a virtual machine according to one implementation.

Although the previous examples illustrated the attachment of read-only application storage volumes, it should be understood that similar processes might be used to provide an end user with writable volumes capable of storing user generated data. Referring now to FIG. 8, FIG. 8 illustrates an overlay process for user generated data and application data within a virtual machine. FIG. 8 includes file system view 800 that is illustrative of a file system for virtual machine prior to an end user being assigned to the virtual machine. File system view 800 includes application directory 810, which further comprises applications 820-822, and user files 815. In operation, a plurality of virtual machines may be initiated on one or more host computing systems to provide virtual computing sessions to end users. These virtual machines include a base image that can then be modified based on the requirements for individual end users. For example, a first end user may require a first set of applications, while a second user requires an unrelated set of applications.

To provide the individualized versions of the virtual machines with the necessary user data and applications, a virtual computing service is provided. The virtual computing service identifies a request for a virtual computing session and, in response to the request, identifies a virtual machine to be provided for the end user associated with the request. In some implementations, the identification of the virtual machine may include identifying a virtual machine that is idle and not currently assigned to another end user. Thus, the virtual computing service may initiate a login process to the virtual machine and, prior to completing the login process, initiate an attach process of one or more storage volumes associated with the requesting end user.

In other implementations, the virtual computing service may identify a virtual machine that requires a change in state because the virtual machine is powered down, suspended, or in some other inactive state. Accordingly, the virtual computing service may initiate a process to make the virtual machine available, which may include powering on the powered down virtual machine, transitioning the virtual machine from suspension into an active state, or some other power state mode. During the power state transition, the hypervisor of the host system for the virtual machine may transfer a notification to the virtual computing service that the power state of the virtual machine has transitioned. In response to the notification, the virtual service may initiate an attach process of one or more storage volumes associated with the requesting end user.

The attach process may include mounting the storage volumes to the virtual machine and overlaying elements of the storage volumes into the virtual machine. This overlaying of the elements may include modifying the registry keys of the virtual machine to recognize attached applications, and may further include modifying the file system view of the virtual machine to make the applications appear as though they have been locally installed. Further, when read-write volumes associated with the end user are included, the objects stored in the read-write volume may be overlaid within the virtual machine.

As illustrated in file system view 801, application 825 is added to the file system with files 830-833. These files may appear as though they have been locally stored with other applications on the virtual machine, but execute via an attached volume to the virtual machine. Further, within user files 815, files 840-841, which correspond to user data, have been added to the virtual machine. In some examples, each virtual machine will store any user saved data to a user volume that can be accessed by the user on any of the virtual machines. For instance, file 840 may be generated on a first virtual machine and the user may attempt to store the file to user files on that virtual machine. Rather than storing file 840 locally to the virtual machine, the file may be stored on the user read-write volume associated with the user, but appear as though it has been locally stored. Accordingly, when the user ends the session on the first virtual machine and initiates a session on a second virtual machine, file 840 may appear in the same location in the file system as where it was saved on the first virtual machine.

Figure 9:
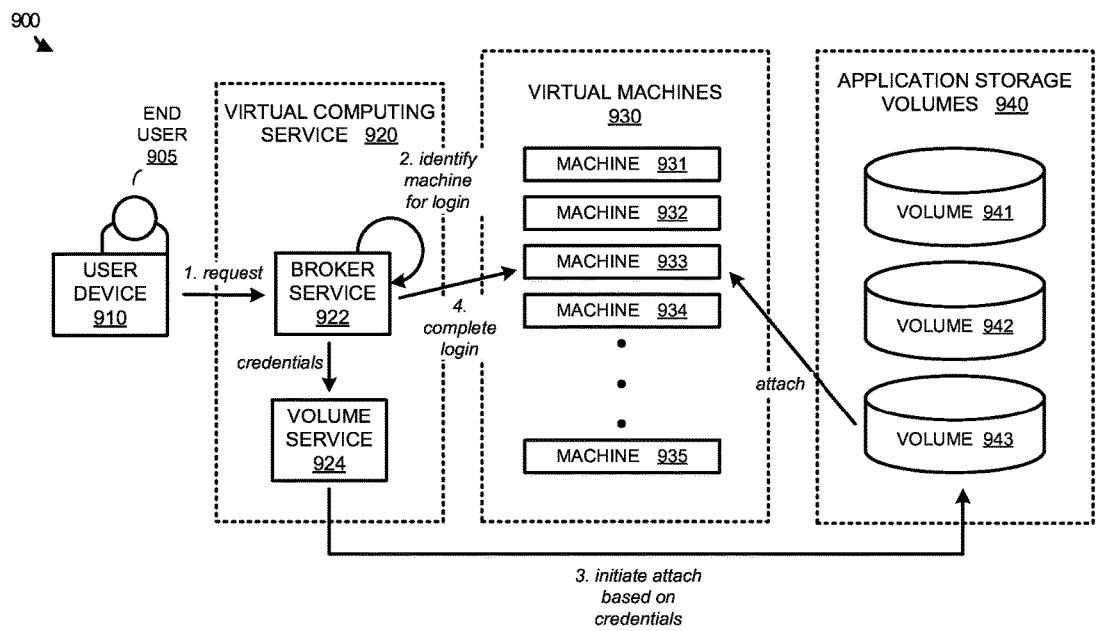
FIG. 9 illustrates an operational scenario to provide user initiated virtual computing sessions in a virtual environment according to one implementation.

Turning to FIG. 9, FIG. 9 illustrates an operational scenario 900 to provide user initiated virtual computing sessions in a virtual environment. Operational scenario 900 includes end user 905, user device 910, virtual computing service 920, virtual machines 930, and application storage volumes 940. Virtual computing service 920 includes broker service 922 and volume service 924, which may execute on one or more computing devices. Virtual machines 930 include individual virtual machines 931-935, and application storage volumes 940 include individual volumes 941-943. Each volume 941-943 in application storage volumes 940 includes one or more applications that are associated with end users based on the end user requirements.

Similar to the operations described above with respect to FIG. 3, virtual computing service 920 is configured to identify a service login request associated with an end user to initiate a virtual computing session using broker service 922. In response to the service login, broker service 922 identifies virtual machine 933 to support the virtual session and initiates a login process to log end user 905 into virtual machine 933. Volume service 924 identifies credentials associated with the service login and further identifies the virtual machine assigned to the session. In some examples, to identify the virtual machine, volume service 924 may receive a virtual machine identifier, which may include a name for the virtual machine, an IP address for the virtual machine, a host identifier for the virtual machine, or any other similar identification information. In response to identifying the credentials and the identity of the virtual machine, volume action service 924 initiates a volume attach process to attach application volume 943 to virtual machine 933 based on the credentials associated with the service login prior to completing the login process. In some examples, the attach process may be initiated before the login process of the end user, however, in other instances, the attach process may be initiated during the login process.

In at least one implementation, an administrator may define applications or application volumes to be associated with end user 905. Consequently, when end user 905 initiates a session, the administrator definitions are checked and volumes that correspond to the necessary applications are attached to the volume. In some examples, the attach process may include mounting volume 943 to the virtual machine, and overlaying the contents of the volume to make the application executable on the virtual machine. This overlaying may include modifying registry keys on the virtual machine, and making the application files from the attached volume accessible in the virtual machine as if the application were locally installed.

Although not illustrated in the present example, it should be understood that user read-write volumes might also be attached to the virtual machine. These volumes store data associated with the user, such as user installed applications, files, or any other similar user data. These user volumes intercept write attempts that would add user data local to the virtual machine and instead store the writes within the user associated volume. Accordingly, when the user ends a session on a first virtual machine and starts a session on a second virtual machine, the applications and files may be overlaid in file system locations consistent with the first virtual machine.

For example, on a first virtual machine, a user may attempt to store a text file to "C:\USER\USER_DATA." Rather than storing the text file locally to the virtual machine, the text file will appear as though it has been stored locally, despite being written to a separate user volume. Thus, when the user ends the session on the first virtual machine, and initiates a session on the second virtual machine, the user volume will be mounted to the second volume, and the text file will be overlaid to appear in "C:\USER\USER_DATA" on the new virtual machine.

Figure 10:
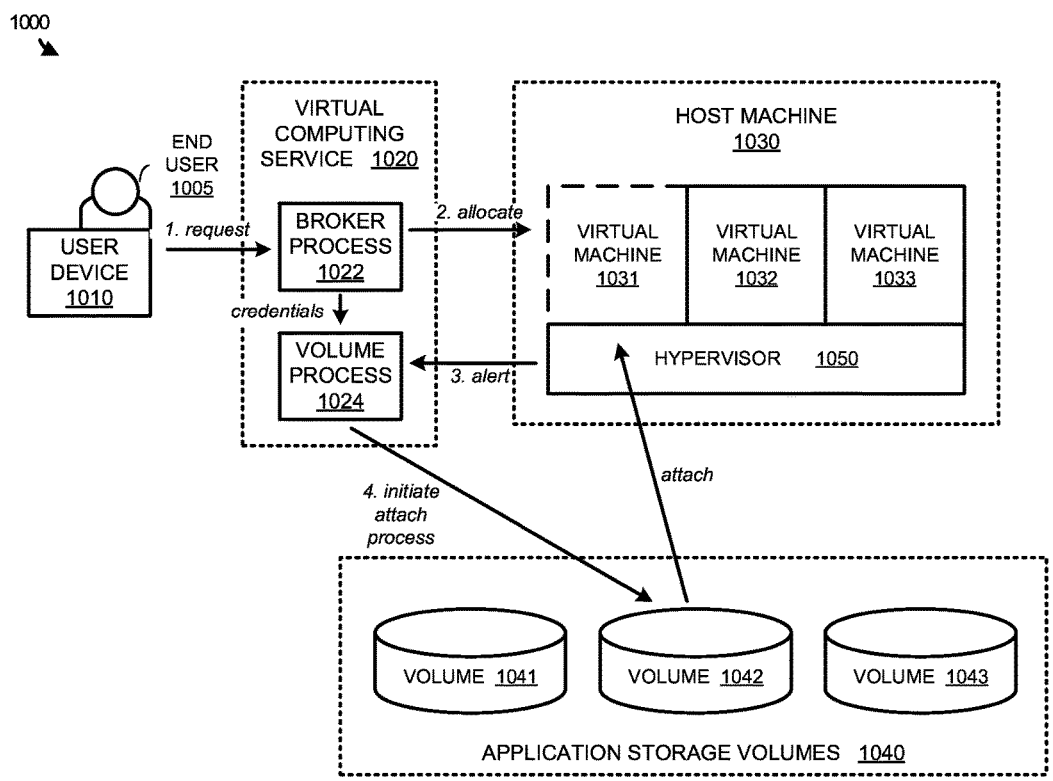
FIG. 10 illustrates an operational scenario to provide user initiated virtual computing sessions in a virtual environment according to one example.

FIG. 10 illustrates an operational scenario 1000 to provide user initiated virtual computing sessions in a virtual environment. Operational scenario 1000 includes end user 1005, user device 1010, virtual computing service 1020, host machine 1030, and application storage volumes 1040. Virtual computing service 1020 includes broker service 1022 and volume service 1024, which may reside on one or more computing systems. Host machine 1030 executes virtual machines 1031-1033 via hypervisor 1050, and application storage volumes 1040 include individual volumes 1041-1043. Each volume 1041-1043 in application storage volumes 1040 includes one or more applications that are associated with end users based on the end user requirements.

As described herein, end user 1005 requests a virtualization computing session on user device 1010. This request is identified by broker process 1012 in virtual computing service 1020. In response to the request, broker process identifies virtual machine 1031 to allocate to the virtual session, wherein the identified virtual machine requires a state transition to become available to the virtual machine. This state transition may include transitioning from a powered off state to a powered on state, transitioning from a suspended state to an available state, or any other power state transition for the virtual machine. To make the machine available, broker process 1022 in virtual computing service 1020 may notify hypervisor 1050 associated with the identified virtual machine to modify the state of the machine. Once the state is changed, hypervisor 1050 may notify volume process 1024 of the state change. In some implementations, in addition to identifying the alert for the change in state of virtual machine 1031, volume process 1024 may also receive credentials associated with the login request, which include a username, a group name, or other identifier associated with end user 1005.

In response to receiving the credentials and the alert from hypervisor 1050, volume process 1024 initiates a volume attach process to attach volume 1042 to virtual machine 1031 based on the credentials for end user 1005. This attaching process may include mounting the volume to virtual machine 1031, and overlaying the contents of the volume into the virtual machine.

Although not illustrated in the present example, it should be understood that user read-write volumes might also be attached to virtual machine 1031. These volumes store data associated with the user, such as user installed applications, files, or any other similar user data. These user volumes intercept write attempts that would add user data locally to the virtual machine and instead store the writes within the attached volume. Accordingly, when the user ends a session on a first virtual machine and starts a session on a second virtual machine, the applications and files may be overlaid in file system locations consistent with the first virtual machine.

For example, on a first virtual machine, a user may attempt to store a text file to "C:\USER\USER_DATA." Rather than storing the text file locally, the text file will appear in a file system view as though it has been stored locally, despite being written to a separate user volume. Thus, when the user ends the session on the first virtual machine, and initiates a session on the second virtual machine, the user volume will be mounted to the second virtual machine, and the text file will be overlaid to appear in "C:\USER\USER_DATA" on the new virtual machine.

Despite being illustrated in FIG. 10 as receiving the alert of the state change from hypervisor 1050 at volume process 1024, it should be understood that in some examples, hypervisor 1050 might notify broker process 1022 of the state change of the virtual machine. As a result, broker process 1022 may notify volume process 1024 of the change of state of virtual machine 1031.

Figure 11:
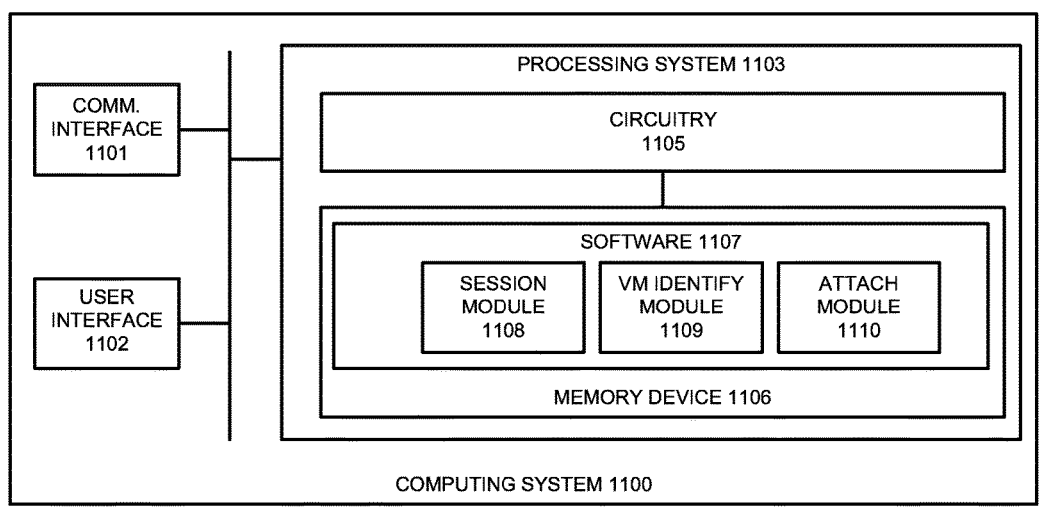
FIG. 11 illustrates a computing system for providing virtual computing services according to one implementation.

FIG. 11 illustrates a computing system 1100 that is representative of any device or system of devices to implement the virtual computing services in FIGS. 1-10, although other examples may exist. Computing system 1100 comprises communication interface 1101, user interface 1102, and processing system 1103. Processing system 1103 is linked to communication interface 1101 and user interface 1102. Processing system 1103 includes processing circuitry 1105 and memory device 1106 that stores operating software 1107. Computing system 1100 may include other well-known components such as a battery and enclosure that are not shown for clarity. Computing system 1100 may be a personal computer, server, or some other computing apparatus—including combinations thereof.

Communication interface 1101 comprises components that communicate over communication links, such as network cards, ports, radio frequency (RF) transceivers, processing circuitry and software, or some other communication devices. Communication interface 1101 may be configured to communicate over metallic, wireless, or optical links. Communication interface 1101 may be configured to use Time Division Multiplex (TDM), Internet Protocol (IP), Ethernet, optical networking, wireless protocols, communication signaling, or some other communication format—including combinations thereof. In some implementations, communication interface 1101 may be configured to communicate with a plurality of end user devices via the internet or some other communication network, and connect the end user devices to one or more host systems that provide a platform for a plurality of virtual machines.

User interface 1102 comprises components that interact with a user to receive user inputs and to present media and/or information. User interface 1102 may include a speaker, microphone, buttons, lights, display screen, touch screen, touch pad, scroll wheel, communication port, or some other user input/output apparatus—including combinations thereof. User interface 1102 may be omitted in some examples.

Processing circuitry 1105 comprises microprocessor and other circuitry that retrieves and executes operating software 1107 from memory device 1106. Memory device 1106 comprises a non-transitory storage medium, such as a disk drive, flash drive, data storage circuitry, or some other memory apparatus. Processing circuitry 1105 is typically mounted on a circuit board that may also hold memory device 1106 and portions of communication interface 1101 and user interface 1102. Operating software 1107 comprises computer programs, firmware, or some other form of machine-readable processing instructions. Operating software 1107 includes session module 1108, virtual machine (VM) identify module 1109, and attach module 1110, although any number of software modules may provide the same operation. Operating software 1107 may further include an operating system, utilities, drivers, network interfaces, applications, or some other type of software. When executed by processing circuitry 1105, operating software 1107 directs processing system 1103 to operate computing system 1100 as described herein.

In particular, session module 1108 is configured to, when executed by processing system 1103 and computing system 1100, identify a service login associated with an end user to initiate a virtual computing session. In response to the login, virtual machine identify module 1109 directs processing system 1103 to identify a virtual machine to allocate to the virtual computing session.

In some implementations, the virtual machine that is identified comprises a virtual machine that is idle and not currently allocated to another end user. Once identified, computing system 1100 may initiate a login process to log the end user into the virtual machine. Before or during the login process to the virtual machine, attach module 1110 initiates a volume attach process to attach at least one application storage volume to the virtual machine based on credentials associated with the service login. This attach process may include mounting the at least one application storage volume to the virtual machine and overlaying contents of the at least one application storage volume to make the application executable. As a result, when the login and attach processes complete, the user may access applications and data from the attached volumes.

In another implementation, the virtual machine that is identified may require a change in power state because it is powered off, in a suspended mode, or otherwise similarly unavailable to be provided to the requesting end user. Accordingly, virtual machine identify module 1109 may direct processing system 1103 to initiate a change in the state of the virtual machine. This initiation of the state change may be directed at the hypervisor, host, or some other process within the virtual environment capable of changing the state of the virtual machine. Upon changing the state of the virtual machine, the hypervisor, or some other process associated with virtual machine may transfer a notification to computing system 1100 indicating the change in state. In response to the notification of the changed state, attach module 1110 initiates a volume attach process to attach at least one application storage volume to the virtual machine based on credentials associated with the service login. This attach process may include mounting the at least one application storage volume to the virtual machine and overlaying contents of the at least one application storage volume to make the application executable. Once the volumes are attached and the end user is logged into the virtual machine, the user may access applications and data from the attached volumes.

Referring back to the elements of FIG. 1, end users 110-112 initiate a virtual session on end user devices. These end user devices may include desktop computers, laptop computers, tablet computers, smartphones, or other similar end user devices, including combinations thereof. The end user devices may include processing systems, data storage systems, communication interfaces to communicate with the virtual computing service, user interface elements to interface with the provided virtual desktop, or any other similar computing element. To communicate with virtual computing service 120 and the assigned virtual machine, the end user devices may employ internet protocol (IP), Ethernet, optical networking, wireless protocols, communication signaling, or some other communication format—including combinations thereof.

Virtual computing service 120 may include communication interfaces, network interfaces, processing systems, computer systems, microprocessors, storage systems, storage media, or some other processing devices or software systems, and can be distributed among multiple devices. Virtual computing service 120 may comprise a server computer, desktop computer, or some other computing device capable of managing the connection between an end user device and a virtual machine.

Virtual machines 130 execute via one or more host computing systems, and hypervisors that abstract the physical components of the host and provide the components to the virtual machine. These virtual components may include virtual processors, communication interfaces, and other virtualized components of the physical host system. Each of the host systems may include communication interfaces, network interfaces, processing systems, computer systems, microprocessors, storage systems, storage media, or some other processing devices or software systems. To communicate with virtual machines 130 and the corresponding host machines, virtual computing service 120 may employ internet protocol (IP), Ethernet, optical networking, wireless protocols, communication signaling, or some other communication format—including combinations thereof.

Application storage volumes 140 may be stored on solid-state media, hard disk media, or some other similar type of media, including combinations thereof. Volumes 141-143 may, in some implementations, comprise virtual disk drives, such as VMDKs or VHDs, although it should be understood that volumes 141-143 might be physical volumes in some examples. Although illustrated separate in the present example, it should be understood that application storage volumes 140 might be stored on the host computing systems with virtual machines 130. In other implementations, application storage volumes 140 may reside on separate computing hardware accessible by virtual machines 130 and the corresponding host systems. This separate computing hardware may include communication interfaces, network interfaces, processing systems, computer systems, microprocessors, storage systems, storage media, or some other processing devices or software systems. Host computing systems may communicate with the separate volume hardware using internet protocol (IP), Ethernet, optical networking, wireless protocols, communication signaling, or some other communication format—including combinations thereof.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a virtual computing service that provides virtual computing sessions to end users using a plurality of virtual machines, the method comprising:
   in response to a service login to the virtual computing service associated with an end user request to initiate a virtual computing session, identifying a virtual machine to allocate to the virtual computing session from the plurality of virtual machines;
   initiating a change of state in the virtual machine to make the virtual machine available for the virtual computing session;
   receiving a notification from a hypervisor associated with the virtual machine indicative of the change in state to the virtual machine;
   initiating a user logon process after the service login to the virtual computing service, wherein the user logon process comprises providing credentials associated with the end user from the virtual computing service to the virtual machine; and
   in response to the notification, prior to completing the user logon process to the virtual machine, initiating a volume attach process to attach at least one application storage volume to the virtual machine based on credentials associated with the service login.

2. The method of claim 1 wherein the change in state to the virtual machine comprises a change in power state for the virtual machine from a powered off state to a powered on state.

3. The method of claim 1 wherein the change in state to the virtual machine comprises a change in suspend state for the virtual machine from a suspended state to an active state.

4. The method of claim 1 wherein the volume attach process comprises mounting the at least one application storage volume to the virtual machine, and overlaying contents of the at least one application storage volume in the virtual machine to make the at least one application executable.

5. The method of claim 4 wherein the contents comprise files and registry keys for the at least one application.

6. The method of claim 1 further comprising, in response to the notification, initiating a supplementary volume attach process to attach at least one user data storage volume to the virtual machine based on the credentials associated with the service login.

7. The method of claim 1 wherein the at least one application storage volume comprises at least one read-only application storage volume.

8. A non-transitory computer readable storage medium having instructions stored thereon that, when executed by a virtual computing service, direct the virtual computing service to perform a method that provides virtual computing sessions to end users using a plurality of virtual machines, the method comprising:
- in response to a service login to the virtual computing service associated with an end user request to initiate a virtual computing session, identifying a virtual machine to allocate to the virtual computing session from the plurality of virtual machines;
- initiating a state change process for the virtual machine to make the virtual machine available for the virtual computing session;
- receiving a notification from a hypervisor associated with the virtual machine indicative of a change in state to the virtual machine; and
- initiating a user logon process after the service login to the virtual computing service, wherein the user logon process comprises providing credentials associated with the end user from the virtual computing service to the virtual machine; and
- in response to the notification, prior to completing the user logon process to the virtual machine, initiating a volume attach process to attach at least one application storage volume to the virtual machine based on credentials associated with the service login.

9. The non-transitory computer readable storage medium of claim 8, wherein the change in state to the virtual machine comprises a change in power state to the virtual machine from a powered off state to a powered on state.

10. The non-transitory computer readable storage medium of claim 8, wherein the change in state to the virtual machine comprises a change in suspend state to the virtual machine from a suspended state to an active state.

11. The non-transitory computer readable storage medium of claim 8, wherein the volume attach process comprises mounting the at least one application storage volume to the virtual machine, and overlaying contents of the at least one application storage volume in the virtual machine to make the at least one application executable.

12. The non-transitory computer readable storage medium of claim 11, wherein the contents comprise files and registry keys for the at least one application.

13. The non-transitory computer readable storage medium of claim 8, wherein the method further comprises, in response to the notification, initiating a supplementary attach process to attach at least one user data storage volume to the virtual machine based on the credentials associated with the service login.

14. The non-transitory computer readable storage medium of claim 8, wherein the at least one application storage volume comprises at least one read-only storage volume.

15. An apparatus comprising:
- one or more non-transitory computer readable storage media;
- a processing system operatively coupled with the one or more non-transitory computer readable storage media; and
- processing instructions stored on the one or more non-transitory computer readable storage media to operate a virtual computing service to provide virtual computing sessions to end users using a plurality of virtual machines that, when executed by the processing system, direct the processing system to:
  - in response to a service login to the virtual computing service associated with an end user request to initiate a virtual computing session, identify credentials associated with the end user request for the virtual computing session;
  - identify a virtual machine to allocate to the virtual computing session from the plurality of virtual machines;
  - initiate a change of state in the virtual machine to make the virtual machine available for the virtual computing session;
  - receive a notification from a hypervisor associated with the virtual machine indicative of the change in state to the virtual machine;
  - initiate a user logon process after the service login to the virtual computing service, wherein the user logon process comprises providing the credentials associated with the end user from the virtual computing service to the virtual machine; and
  - in response to the notification, prior to completing the user logon process to the virtual machine, initiate a volume attach process to attach at least one storage volume to the virtual machine based on the credentials.

16. The apparatus of claim 15, wherein the change in state to the virtual machine comprises a change in power state for the virtual machine from a powered off state to a powered on state.

17. The apparatus of claim 15, wherein the change in state to the virtual machine comprises a change in suspend state for the virtual machine from a suspended state to an active state.

18. The apparatus of claim 15, wherein the at least one storage volume comprises at least one application storage volume storing at least one application, and at least one user data storage volume.

19. The apparatus of claim 18, wherein the volume attach process comprises mounting the at least one application storage volume and that at least one user data storage volume and overlaying contents of the at least one application storage volume and the at least one user data storage volume in the virtual machine.

* * * * *